United States Patent [19]
Koseki

[11] Patent Number: 5,234,776
[45] Date of Patent: Aug. 10, 1993

[54] SOLID POLYMER ELECTROLYTE FUEL CELL SYSTEM WITH RIBBED CONFIGURATION

[75] Inventor: Kazuo Koseki, Kawasaki, Japan

[73] Assignee: Fuji Electric Co., Ltd., Kawasaki, Japan

[21] Appl. No.: 739,981

[22] Filed: Aug. 2, 1991

[30] Foreign Application Priority Data

Aug. 3, 1990 [JP] Japan .................. 2-206346

[51] Int. Cl.⁵ .......................... H01M 8/10
[52] U.S. Cl. ........................ 429/30; 429/34; 429/39; 429/41
[58] Field of Search .......... 429/40, 39, 38, 41, 429/30, 34, 17

[56] References Cited

U.S. PATENT DOCUMENTS

| | | | |
|---|---|---|---|
| 4,233,146 | 11/1980 | Rothmayer et al. | 429/39 X |
| 4,615,955 | 10/1986 | Amakawa et al. | 429/41 X |
| 5,023,152 | 6/1991 | Akagi | 429/39 X |

FOREIGN PATENT DOCUMENTS 175266  10/1983  Japan .................. 429/40

Primary Examiner—John S. Maples
Attorney, Agent, or Firm—Spencer, Frank & Schneider

[57] ABSTRACT

In a solid electrolyte polymer fuel cell system, a fuel cell includes ribs integrally formed with an anode or an anode chamber, ribs integrally formed with a cathode or cathode chamber, and a water distributor. The water distributor may be a beam provided with slits, an electroconductive body, a wick, or a combination of the beam with slits and a hydrophilic body. Fuel gas and water distributed by the water distributor are passed through the ribs of the ribbed anode or ribbed anode chamber to provide sufficient hydrogen ions and water of inclusion with the solid polymer electrolyte. Oxidizer gas and water to be discharged are passed through the ribs of the ribbed cathode or ribbed cathode chamber. Water is discharged efficiently.

10 Claims, 10 Drawing Sheets

SOLID POLYMER ELECTROLYTE FUEL CELL SYSTEM WITH RIBBED CONFIGURATION

BACKGROUND OF THE INVENTION

1. Field of the Invention

The present invention relates to a solid polymer electrolyte fuel cell system and more particularly to an improved fuel cell structure and method for feeding water of inclusion in a solid polymer electrolyte membrane and for feeding reaction gases for the fuel cell system.

2. Description of Prior Art

Fuel cells are roughly classified into two groups, for example, low temperature-operating ones such as an alkali type, a solid polymer electrolyte type, and a phosphoric acid type, and high temperature-operating ones such as a molten salt type, and a solid oxide electrolyte type.

Solid polymer electrolyte type fuel cells have a solid polymer electrolyte membrane having two main surfaces provided with an anode and a cathode, respectively, and an electrode substrate, the anode and cathode being sandwiched by the solid polymer electrolyte and the respective electrode substrates. As the solid polymer electrolyte membrane, there have been used polystyrene cation exchange resins having a sulfonic acid group as cationic electroconductive membranes, fluorocarbon sulfonic acid/polyvinylidene fluoride mixed membranes, or membranes composed of a fluorocarbon matrix and trifluoroethylene grafted thereto.

Recently, fuel cells with a prolonged service life by the use of perfluorocarbonsulfonic acid membrane (Nafion, trade name for a product by DuPont de Nemours, Ill. U.S.A.) have been put on the market. Solid polymer electrolyte membranes have proton (hydrogen ion) exchange groups in their molecule and have resistivities not higher than 20 $\Omega\cdot$cm at room temperature when hydrated to saturation, thus acting as a proton-conductive electrolyte. Saturated water content varies reversibly depending on the temperature of the membrane.

An electrode substrate, which is made of a porous material, acts as a means for supplying a reaction gas to a fuel cell and also as a collector. In anodes or cathodes, there are formed three phase zones where electrochemical reactions takes place.

In an anode, there occurs the following reaction:

(1)

In a cathode, what occurs is the following reaction:

(2)

In other words, in the anode, hydrogen supplied from outside of the system produces protons (H+) and electrons (e−). Protons produced migrate through the ion exchange membrane toward the cathode whereas electrons migrate into the cathode through an external circuit connected thereto. On the other hand, in the cathode, oxygen supplied from outside of the system, protons which have migrated through the ion exchange membrane and electrons transferred through the external circuit react to produce water ($H_2O$).

In this type of solid polymer electrolyte fuel cells, protons migrate from the anode to the cathode through the ion exchange membrane in a hydrated state, resulting in that the water content of the membrane in the vicinity of the anode decreases and the ion exchange membrane tends to be dried. Hence migration of protons becomes difficult in the vicinity of the anode unless water is supplied thereto. On the other hand, in the cathode, water is produced as shown by formula (2) above. However, generally solid polymer electrolyte fuel cells are operated at temperatures not higher than 100° C., which means that water produced on the cathode side is considered to be in a liquid state. Therefore, in the cathode, excess amounts of water accumulate since water is not only freshly produced as a result of electrode reaction but also released from hydrated protons due to disappearance of the protons in the reaction on the cathode. The water which has accumulated would fill and clog pores in the electrode substrate to inhibit diffusion of the reaction gas therethrough.

Accordingly, in order to operate a solid polymer electrolyte fuel cell continuously and efficiently, it is necessary to properly supply water to the anode to replenish water of inclusion contained by the solid polymer electrolyte membrane and discharge the water which has migrated therefrom and accumulated in the cathode. For optimizing the water content of the ion exchange membrane, the water of inclusion in the ion exchange membrane has conventionally been replenished by bubbling the fuel gas into water kept at a temperature higher than the temperature at which the fuel cell is operated to humidify the fuel gas and supplying the gas thus humidified to the anode side of the fuel cell. On the other hand, the water which accumulated in the cathode has conventionally been discharged by supplying a large amount of dry oxidizer gas to the cathode of the fuel cell, or by cooling steam formed in the cathode to condense it and discharging the resulting water to outside the system.

However, the conventional method in which water in the form of steam is supplied to the ion exchange membrane to replenish therewith the water of inclusion in the membrane has some problems. For example, the conventional method does not supply an amount of water which is enough to replenish the water which has migrated due to hydration because water condenses in the inside of the ion exchange membrane in an amount which corresponds to the difference between the saturation vapor pressure of the reaction gas at a humidification temperature and the saturation vapor pressure at a cell operation temperature. Thus, it is generally difficult to use a large difference between the humidification temperature and the cell operation temperature. Further, use of increased humidification temperatures leads to an increase in the partial pressure of aqueous vapor (0.47 atm at 80° C.; 0.69 atm at 90° C.) to thus decrease the partial pressure of the fuel gas. As a result, supply of the fuel gas decreases to deteriorate the characteristics of the fuel cell.

SUMMARY OF THE INVENTION

An object of the present invention is to overcome the aforementioned problems involved in the prior art and provide a solid polymer electrolyte fuel cell system in which fuel gas and water for replenishing water of inclusion contained in the solid polymer electrolyte membrane are supplied to the anode with sufficient efficiency and which has a high current-voltage characteristics.

Another object of the present invention is to provide a method for supplying fuel gas and water for replenishing water of inclusion contained by a solid polymer electrolyte membrane in which water is supplied in a liquid state in order to supply fuel gas at a high partial pressure without being adversely influenced by the partial pressure of aqueous vapor.

Still another object of the present invention is to provide a solid polymer electrolyte fuel cell system and a method for supplying fuel gas and water for replenishing water of inclusion contained in a solid polymer electrolyte membrane in which water is supplied without inhibiting the flow of reaction gases.

As a result of extensive investigations by the present inventors, it has now been found that the aforementioned objects can be achieved by the provision of rib means in the anode chambers and cathode chambers, and also a water distribution means in the anode chamber. The present invention is based on this discovery.

In the first aspect of the present invention, a solid polymer electrolyte fuel cell system comprises:
- a solid polymer electrolyte membrane;
- an anode chamber arranged in contact with the solid polymer electrolyte membrane;
- a cathode chamber arranged in contact with the solid polymer electrolyte membrane, the cathode chamber and the anode chamber sandwiching therebetween the solid polymer electrolyte membrane;
- a ribbed anode arranged in the anode chamber and having a first surface provided with a plurality of first ribs defining a plurality of first grooves and a second surface which is flat and in contact with the solid polymer electrolyte membrane;
- a ribbed cathode arranged in the cathode chamber and having a first surface provided with a plurality of second ribs defining a plurality of second grooves and a second surface which is flat and in contact with the solid polymer electrolyte membrane;
- a water feed pipe for feeding water connected to the anode chamber;
- a fuel gas feed pipe connected to the anode chamber and feeding a fuel gas;
- a water distribution means for distributing water fed from the water feed pipe to the plurality of first ribs, the water distribution means being arranged in the anode chamber;
- a first discharge pipe connected to the anode chamber and discharging an unused fuel gas and water; and
- an oxidizer gas feed pipe connected to the cathode chamber and feeding an oxidizer gas;
- a second discharge pipe connected to the cathode chamber and discharging an unused oxidizer gas and water;
whereby the fuel gas passes in the first grooves and the oxidizer gas passes in the second grooves.

Here, the water distribution means may comprise a beam arranged above the ribbed anode and provided with a restricted passage through which the water from the water feed pipe flows down.

The water distribution means may comprise an electroconductive porous body arranged in contact with the first surface of the ribbed anode.

The water distribution means may comprise a network composed of a wick arranged along and between the first ribs of the ribbed anode.

The water distribution means may comprise a beam arranged above the ribbed anode and provided with a restricted passage through which water flows down and a hydrophilic band arranged along and embedded in the first ribs of the ribbed anode.

In the second aspect of the present invention, a solid polymer electrolyte fuel cell system comprises:
- a solid polymer electrolyte membrane;
- a ribbed anode chamber arranged in contact with the solid polymer electrolyte membrane and having a first surface provided with a plurality of first ribs defining a plurality of first grooves;
- a cathode chamber arranged in contact with the solid polymer electrolyte membrane and having a first surface provided with a plurality of second ribs defining a plurality of second grooves, the cathode chamber and the anode chamber sandwiching therebetween the solid polymer electrolyte membrane;
- an anode arranged in the anode chamber having a first surface which is flat and in contact with the solid polymer electrolyte membrane, and a second surface which is flat and in contact with the first ribs of the ribbed anode chamber;
- a cathode arranged in the cathode chamber and having a first surface which is flat and in contact with the solid polymer electrolyte membrane and a second surface which is flat and in contact with the second ribs of the ribbed cathode chamber;
- a water feed pipe for feeding water connected to the ribbed anode chamber;
- a fuel gas feed pipe connected to the ribbed anode chamber and feeding a fuel gas;
- a water distribution means for distributing water fed from the water feed pipe to the plurality of first ribs of the ribbed anode chamber, the water distribution means being arranged in the ribbed anode chamber;
- a first discharge pipe connected to the ribbed anode chamber and discharging an unused fuel gas and water; and
- an oxidizer gas feed pipe connected to the ribbed cathode chamber and feeding an oxidizer gas;
- a second discharge pipe connected to the ribbed cathode chamber and discharging an unused oxidizer gas and water;
whereby the fuel gas passes in the first grooves and the oxidizer gas passes in the second grooves.

Here, the water distribution means may comprise a beam arranged in an upper portion of the ribbed anode chamber and provided with a restricted passage through which the water from the water feed pipe flows down.

The water distribution means may comprise an electroconductive porous body provided in the first ribs of the ribbed anode chamber.

The water distribution means may comprise a network composed of a wick arranged along and between the first ribs of the ribbed anode chamber.

The water distribution means may comprise a beam having a restricted passage for water and a hydrophilic band arranged along and embedded in the first ribs of the ribbed anode chamber.

In the third aspect of the present invention, a method for feeding water of inclusion contained in a solid polymer electrolyte membrane and gases in a solid polymer electrolyte fuel cell system having a solid polymer electrolyte membrane, an anode chamber, a cathode chamber, an anode, and a cathode, the anode chamber and cathode chamber sandwiching the solid polymer electrolyte membrane, comprises the steps of:
providing an anode chamber including a ribbed anode having a first surface provided with a plurality of first ribs defining first grooves and a second surface, opposite to the first surface, being flat and in contact with the solid polymer electrolyte membrane, a ribbed cathode having a first surface provided with a plurality of second ribs defining second grooves and a second surface, opposite to the first surface, being flat and in contact with the solid polymer electrolyte membrane and a water distribution means in the anode chamber;

passing a fuel gas through the first grooves;

passing water through the water distribution means to distribute water in the first ribs;

discharging an unused portion of the fuel gas and an excess portion of the water through a first discharge pipe;

passing an oxidizer gas through the second grooves to the cathode to produce water; and discharging the water produced in the cathode and an unused portion of the oxidizer gas.

Here, the water distribution means may comprise a beam arranged above the ribbed anode and provided with a restricted passage through which the water flows down.

The water distribution means may comprise an electroconductive porous body arranged in contact with the first surface of the ribbed anode.

The water distribution means may comprise a network composed of a wick arranged along and between the first ribs of the ribbed anode.

The water distribution means may comprise a beam arranged above the ribbed anode and provided with a restricted passage through which water flows down and a hydrophilic band arranged along and embedded in the first ribs of the ribbed anode.

In the fourth aspect of the present invention, a method for feeding water of inclusion contained in a solid polymer electrolyte membrane and gases in a solid polymer electrolyte fuel cell system having a solid polymer electrolyte membrane, an anode chamber, a cathode chamber, an anode, and a cathode, the anode chamber and cathode chamber sandwiching the solid polymer electrolyte membrane, comprises the steps of:

providing a ribbed anode chamber including an anode, the ribbed anode chamber having a plurality of first ribs defining a plurality of first grooves, the first ribs opposing the solid polymer electrolyte membrane via the anode, a ribbed cathode having a plurality of second ribs defining a plurality of second grooves, the second ribs opposing the solid polymer electrolyte membrane via the cathode, and a water distribution means in the anode chamber;

passing a fuel gas through the first grooves;

passing water through the water distribution means to distribute water in the first ribs;

discharging and unused portion of the fuel gas and an excess portion of the water through a first discharge pipe;

passing an oxidizer gas through the second grooves to the cathode to produce water; and discharging the water produced in the cathode and an unused portion of the oxidizer gas.

Here, a beam may be arranged above the ribbed anode, a restricted passage may be formed in the beam, and the water may be passed through the restricted passage to the first ribs of the ribbed anode chamber.

An electroconductive porous body having a plurality of ribs may be provided, and the water may be passed through the ribs of the electroconductive porous body.

A wick in the form of a network may be provided along and between the first ribs of the ribbed anode chamber, and water may be passed through the wick.

A beam may be provided above the ribbed anode, a restricted passage through which water flows down, a hydrophilic band may be arranged along and embedded in the first ribs of the ribbed anode chamber.

According to the present invention, the fuel gas and the water from the water distribution means flow well in the rib means in the form of ribs in a ribbed anode or in the form of a ribbed anode chamber to sufficiently diffuse the fuel gas and water in pores in the ribbed anode or L-form bores. The water is uniformly distributed in respective ribs in the ribbed anode or anode chamber to form a unique flow of water. The water which flows down through a plurality of restricted passages provided in a horizontal beam in the anode chamber flows on respective surfaces of the ribs of the ribbed anode or anode chamber which surfaces correspond to the restricted passages. Fuel gas flows on other surfaces of the ribs of the ribbed anode or anode chamber. When an electroconductive porous material is used as the water distribution means or water distributor, the water migrates into the electroconductive porous material as a result of capillary action, which gives similar effects to those of water flowing on the surfaces of the ribs of the ribbed anode or anode chamber. The water migrates through a wick due to capillary action and thus the water can flow through a network composed of a wick. In the case of the combination of a horizontal beam with restricted passages and hydrophilic bands, the water flows through respective restricted passages of the horizontal beam onto the underlying hydrophilic bodies or bands, and then the water flows along and inside the ribs of the ribbed anode or anode chamber. When it has reached the anode the water is taken up as water of inclusion by the ion exchange membrane while the fuel gas which has reached the anode is dissociated to give protons ($H^+$). In this manner, the water for replenishing the water of inclusion in the ion exchange membrane is supplied in a liquid state so that the fuel gas can be supplied at a high partial pressure without adverse influences from the partial pressure of aqueous vapor. As a result the ion exchange membrane can be maintained always in a sufficiently wet state, so that its resistance polarization can be maintained at a low level. Utilization of the fuel gas at a high concentration reduces concentration polarization. These features, together with good flow of oxidizer gas and water in the ribs of the ribbed cathode or cathode chamber, give a basis of improved polarization characteristics of the solid polymer electrolyte fuel cell system of the present invention.

Flow of the oxidizer gas and water through the ribs of the ribbed cathode or cathode chamber is substantially the same as in the case of flow of the fuel gas and water through the ribs of the ribbed anode or anode chamber.

While the present invention is applied typically to a hydrogen-oxygen fuel cell it can also be applied to other types of fuel cell systems, such as one using methanol gas as the fuel gas, so far as replenishment of water of inclusion contained in the solid polymer electrolyte membrane is necessary or effective.

The above and other objects, effects, features and advantages of the present invention will become more apparent from the following description of embodiments thereof taken in conjunction with the accompanying drawings.

DESCRIPTION OF THE PREFERRED EMBODIMENTS

Hereinafter, the present invention will be described in greater detail with reference to some embodiments thereof which should not be construed as limiting the present invention thereto in any manner.

Embodiment 1

Figure 1:
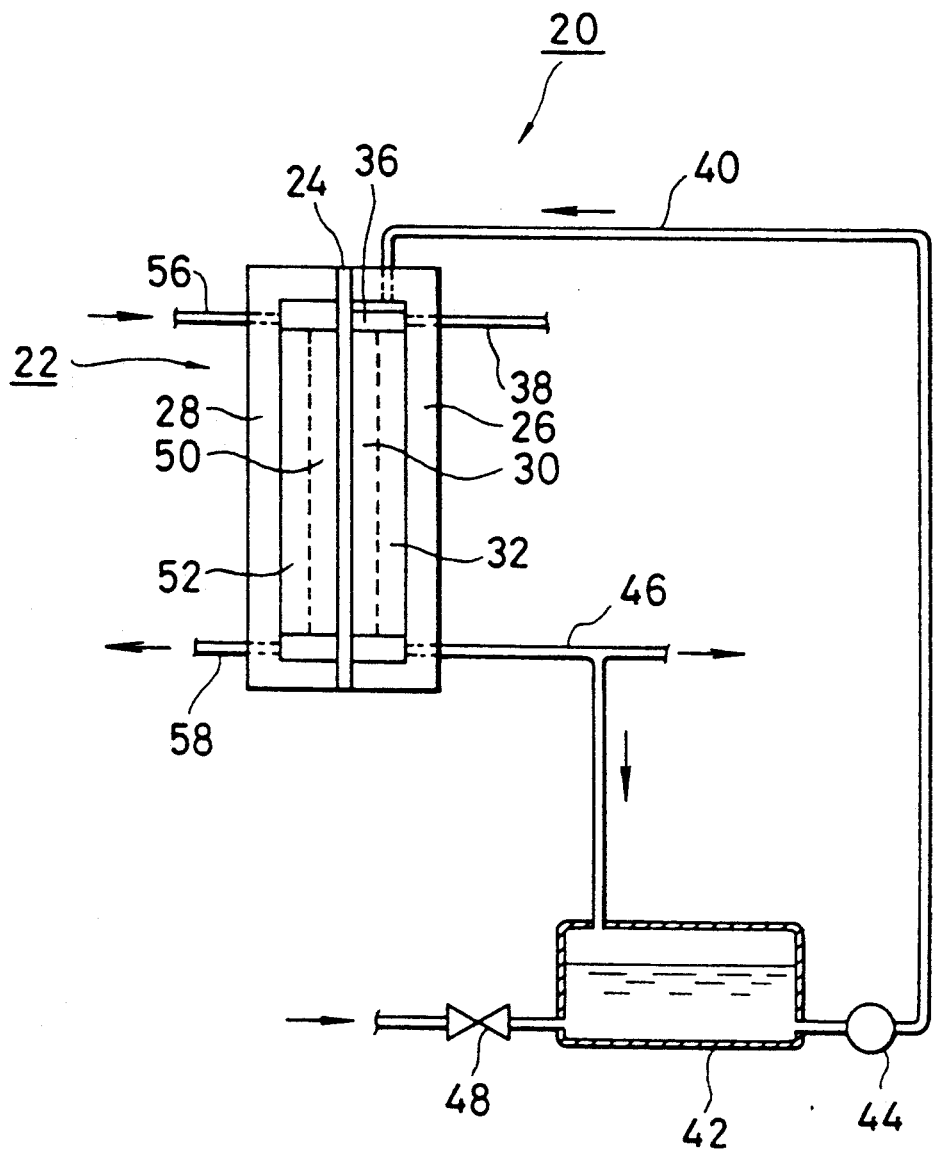
FIG. 1 is a partially cross sectioned schematic view showing a solid polymer electrolyte fuel cell system according to Embodiment 1 of the present invention.
Figure 2:
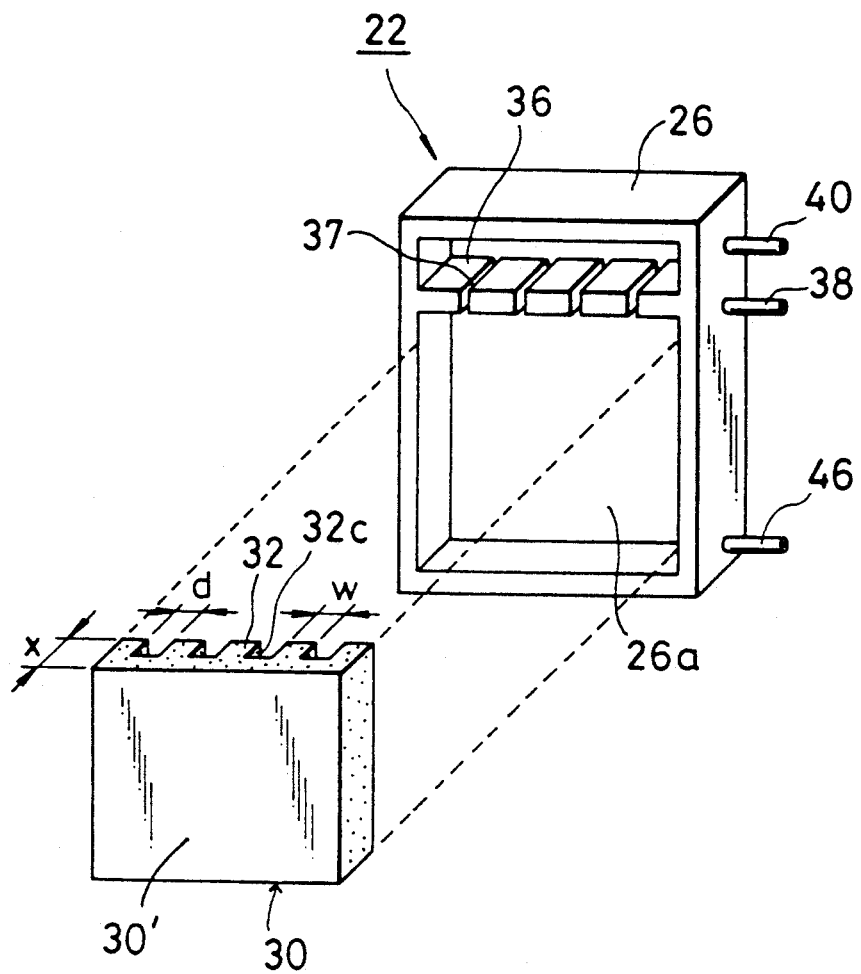
FIG. 2 is an exploded perspective view showing the interior of an anode chamber in the solid polymer electrolyte fuel cell system shown in FIG. 1.
Figure 2A:
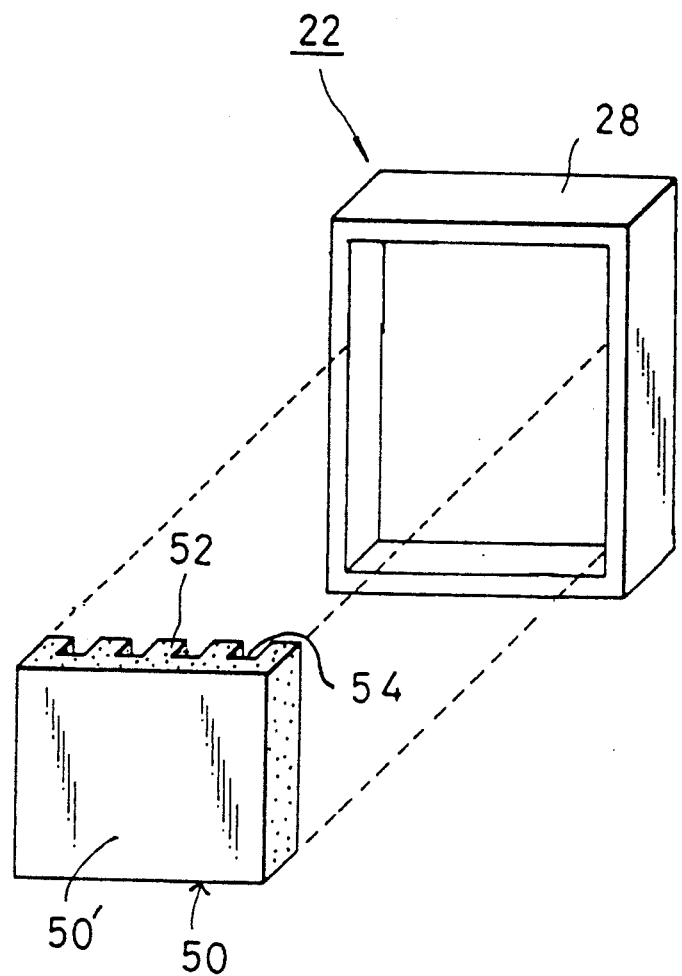
FIG. 2A is an exploded perspective view partially showing the interior of a cathode chamber in the solid polymer electrolyte fuel cell system of FIG. 1.

FIG. 1 is a partially cross sectioned schematic view showing a solid polymer electrolyte fuel cell system according to Embodiment 1. FIG. 2 is an exploded perspective view showing the interior of the anode chamber in the SPE fuel cell shown in FIG. 1, and FIG. 2A is an exploded partial perspective view showing the interior of a cathode chamber in the solid polymer electrolyte fuel cell system of FIG. 1, with a feed pipe and a second discharge pipe being omitted. As shown in FIG. 1, a solid polymer electrolyte fuel cell system 20 includes a fuel cell 22, which includes a solid polymer electrolyte membrane 24, an anode chamber 26 and a cathode chamber 28, the anode and cathode chambers 26 and 28 sandwiching therebetween the SPE membrane 24. The anode chamber 26 contains a ribbed anode 30 having a plurality of ribs 32 parallel to each other and arranged generally vertically, and a beam 36 above the ribbed anode 30. The beam 36 is arranged substantially horizontally in the upper space at proper distances from an upper inner surface of the anode chamber and from respective upper ends of the ribs 32 of the ribbed anode 30. The horizontal beam 36 is formed integrally with the anode chamber 26. The beam 36 has a plurality of restricted passages 37 each in the form of a slit through which water can flow down. The respective positions of the slits 37 correspond to side surfaces 32c of the ribs 32, the side surfaces 32c being perpendicular to the side surfaces of the ribs 32 opposing the inner side surface 26a of the anode chamber.

The cathode chamber 28 (FIG. 2A) contains a ribbed cathode 50 having a plurality of ribs 52 parallel to each other and arranged generally vertically. The ribbed anode 30 (FIG. 2) has a first surface 30', which is flat and arranged on the side of the SPE membrane 24, and a second surface, on which the ribs 32 are formed integral to the anode and which is arranged on the gas side or the side opposing an inner side surface 26a of the anode chamber 26. Similarly, the ribbed cathode 50 has a first surface 50', which is flat and arranged on the side of the SPE membrane, and a second surface, on which the ribs 52 are formed integral to the cathode and which is arranged on the gas side or the side opposing an inner side surface of the cathode chamber 28. The first surfaces (flat surfaces) of the anode and cathode are coated with a platinum catalyst layer (not shown) and these first surfaces are pressed against the SPE membrane 24. Reaction gases (a fuel gas and an oxidizer gas) fed through feed pipes 38 and 56, respectively, flow through vertical grooves 34 and 54, respectively, defined by the ribs 32 and 52 of the ribbed anode 30 and ribbed cathode 50, respectively, together with the inner side surfaces of the anode and cathode chambers 26 and 28, respectively. Water in a liquid state is fed through a water feed pipe 40, separately from the fuel gas feed pipe 38, from a water reservoir 42 by a pump 44 and introduced into the anode chamber 26, and separated into a discharge water and a discharge fuel gas (unused) through a first discharge pipe 46. The separated water is fed back to the water reservoir 42, and recycled.

The water which flows into the anode chamber 26 from the water feed pipe 40 passes through slits 37 of the horizontal beam 36. The aforementioned position of the slits 37 makes it possible for water to flow down along the side surfaces 32c of the first rib elements. The restricted passages 37 may be of any other form, e.g., a plurality of perforations arranged in a line so far as such can provide a restricted downward flow of water. Since the amount of the water which flows through the slits 37 is small or restricted, the water flows down along the side surfaces of the groove defined by the ribs 32 and the anode but does not fill or close the grooves (or ducts when taken together with the inner side surface of the anode chamber), with the result that flow of the fuel gas is not prevented. The water which is flowing down is partly absorbed by the ribbed anode 30 and migrates into the SPE membrane 24. The portion of the water which has not been absorbed reaches the bottom of the anode chamber and combined there, and then discharged through the first discharge pipe 46. An oxidizer gas is fed to the cathode chamber 28 through an oxidizer gas feed pipe 56 and passes through the ribs 52 of the ribbed cathode 50. The oxidizer gas is used in the electrode reaction which takes place in a three phase zone formed between the cathode and the SPE membrane to produce water. Unused portion of the oxidizer gas together with wter produced (including water derived from hydration water in hydrated protons) is discharged through a second discharge pipe 58. A platinum catalyst layer (not shown) is provided between the ribbed cathode 50 and the SPE membrane 24. The structure of the ribbed cathode 50 may be substantially the same as the ribbed anode 30.

EMBODIMENT 2

Figure 3:
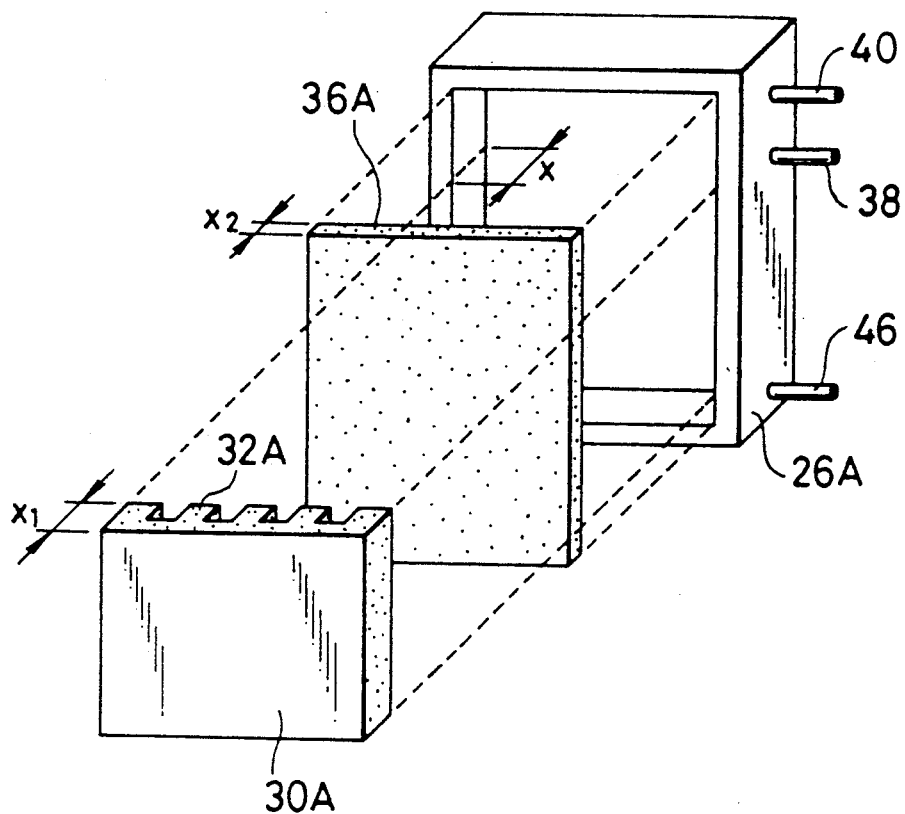
FIG. 3 is an exploded perspective view showing the interior of a anode chamber in a solid polymer electrolyte fuel cell system according to Embodiment 2 of the present invention.

FIG. 3 is an exploded perspective view showing the interior of an anode chamber in the solid polymer electrolyte fuel cell system according to Embodiment 2. As shown in FIG. 3, an anode chamber 26A is provided therein with an electroconductive porous plate 36A instead of the horizontal beam 36 with slits 37 used in Embodiment 1 (FIG. 2). The electroconductive porous plate 36A contacts ribs 32A of a ribbed anode 30A. The height of the porous plate 36A is such that its top end is just below a water feed pipe 40 connected to an upper part of the anode chamber. The thickness of the porous plate 36A is set such that sum of the thickness, $x_1$, of a portion of the ribbed anode 30A where one of the ribs 32A is present and the thickness, $x_2$, of the porous plate 32A is equivalent to the depth, x, of the anode chamber 26A.

Water is supplied on the top end of the porous plate 36A, and spreads through the entire porous plate. A portion of the water supplied migrates from the plate 36A to the SPE membrane 24 through the ribs 32A of the ribbed anode 30A, and is absorbed by the membrane. Excessive water (unabsorbed portion) transudes from a lower end of the porous plate 36A, and discharged together with unused fuel gas through the first discharge pipe 46. Suitably the electroconductive porous plate 36A is made of a metal. Also, woven or nonwoven fabrics of carbon may be used as the porous material.

Embodiment 3

Figure 4:
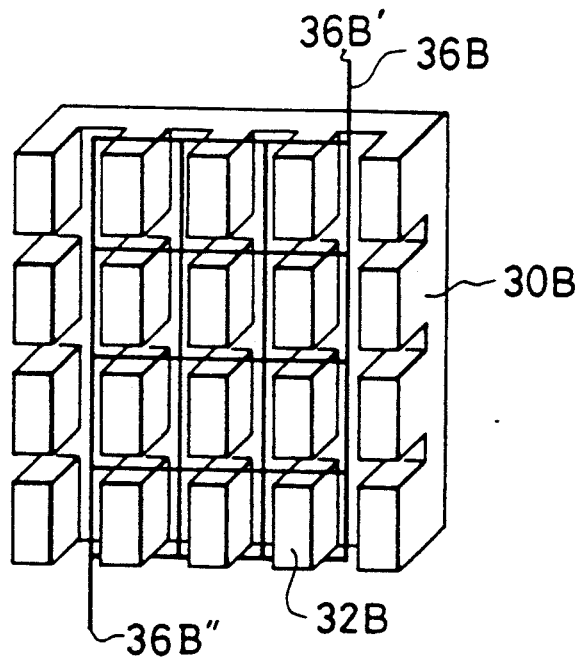
FIG. 4 is a perspective view showing a combination of a ribbed anode and a network composed of a wick in a solid polymer electrolyte fuel cell system according to Embodiment 3 of the present invention.

FIG. 4 is a perspective view showing a combination of a ribbed anode and a wick in a solid polymer electrolyte fuel cell system according to Embodiment 3. A ribbed anode 30B is provided with horizontal grooves and vertical grooves to form many island-like isolated protrusions or ribs 32B. A wick 36B is provided around the respective ribs 32B to form a network. An upper end 36B' of the wick may be arranged in the vicinity of an opening of the water feed pipe 40 (FIG. 3) in the anode chamber 26A (FIG. 3). Water supplied through the water feed pipe 40 (FIG. 3) penetrates or passes through the wick and migrates to the ribbed anode 30B through the ribs 32B, and is absorbed by the SPE membrane 24 (FIG. 1). Unabsorbed water or excessive water transudes from a lower end 36B'' of the wick, and is discharged through the first discharge pipe 46 (FIG. 3) together with unreacted fuel gas. The wick is made of fine threads of a fibrous material preferably selected from various natural fiber, synthetic fiber or metallic fiber, the fine threads having been twisted together.

Embodiment 4

Figure 5:
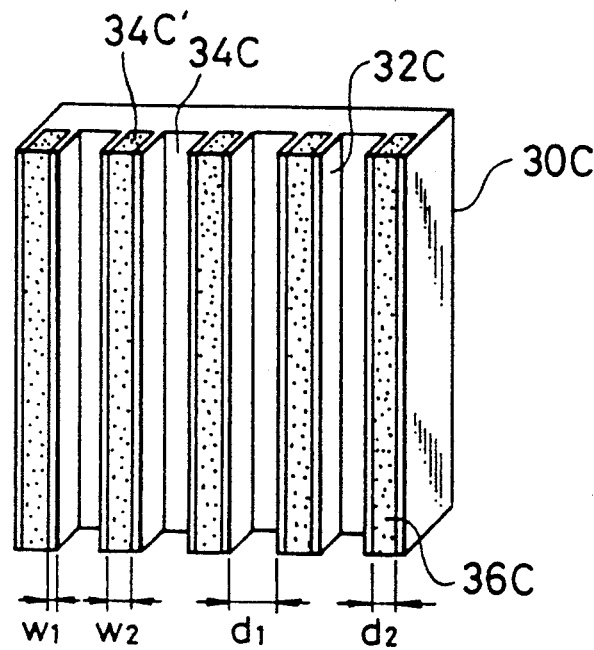
FIG. 5 is a perspective view showing a combination of a ribbed anode and a hydrophilic band in a solid polymer electrolyte fuel cell system according to Embodiment 4 of the present invention.

FIG. 5 is a perspective view showing a combination of a ribbed anode and a hydrophilic band in a solid polymer electrolyte fuel cell system according to Embodiment 4. A ribbed anode 30C has a plurality of integral ribs 32C vertically arranged and parallel to each other to define a groove 34C between any two adjacent ribs 32C. A hydrophilic band 36C is provided in every other groove 34C. The width, $w_1$, of the rib 32C is made somewhat smaller than the thickness, w, of the anode 30 in FIG. 2. In the instant embodiment, the sum of the width, $w_2$, of the hydrophilic band 36C and the widths, $w_1$ and $w_1$, of two ribs 32C sandwiching the hydrophilic band may be set equivalent to w. Usually, the distance, $d_1$, between two adjacent ribs 32C defining a groove 34C without the hydrophilic band 36C may be different from (larger than) the distance, $d_2$ ($d_2=w_2$), between two adjacent rib potions 32C defining a groove 34C' stuffed with the hydrophilic band 36C. However, it is also possible to provide the ribs 32C at the same pitch and fill the hydrophilic band 36C in every other groove defined by the ribs. Water fed from the water feed pipe 40 (FIG. 2) flows down through a horizontal beam of the same structure as the horizontal beam 36 having slits 37 shown in FIG. 2 and distributes to a plurality of the hydrophilic bands 36C. A portion of the water supplied migrates from the hydrophilic bands 36C to the ribs 32C sandwiching the respective hydrophilic bands, and is absorbed by the SPE membrane 24 (FIG. 1). Excessive water transudes from respective lower ends of the hydrophilic bands 36C, and is discharged through the first discharge pipe 46 (FIG. 2). The hydrophilic band 36C may be a rod of a porous metal, a felt or a twisted yarn.

Figure 6:
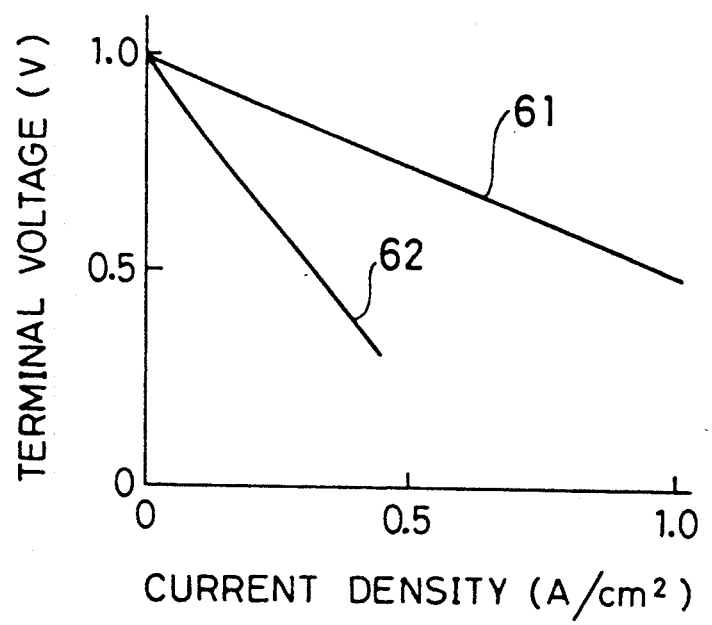
FIG. 6 is a graph illustrating characteristics of the fuel cells according to Embodiments 1 to 4 according to the present invention as compared with the characteristics of a conventional fuel cell system.

FIG. 6 is a graph illustrating characteristics of the fuel cells according to Embodiments 1 to 4 of the present invention as compared with the characteristics of a conventional fuel cell system. In the graph the horizontal axis indicates current density (A/cm$^2$) and the vertical axis indicates terminal voltage. The water of inclusion contained in the ion exchange membrane used is supplied in a liquid state and therefore the ion exchange membrane (SPE membrane) is maintained always in a sufficiently wet state, thus decreasing resistance polarization. Since the fuel cell systems of the present invention enable supply of the fuel gas at a high concentration, concentration polarization decreases. Therefore, according to the present invention a solid polymer electrolyte fuel cell system having improved polarization characteristics can be obtained.

Embodiment 5

Figure 7:
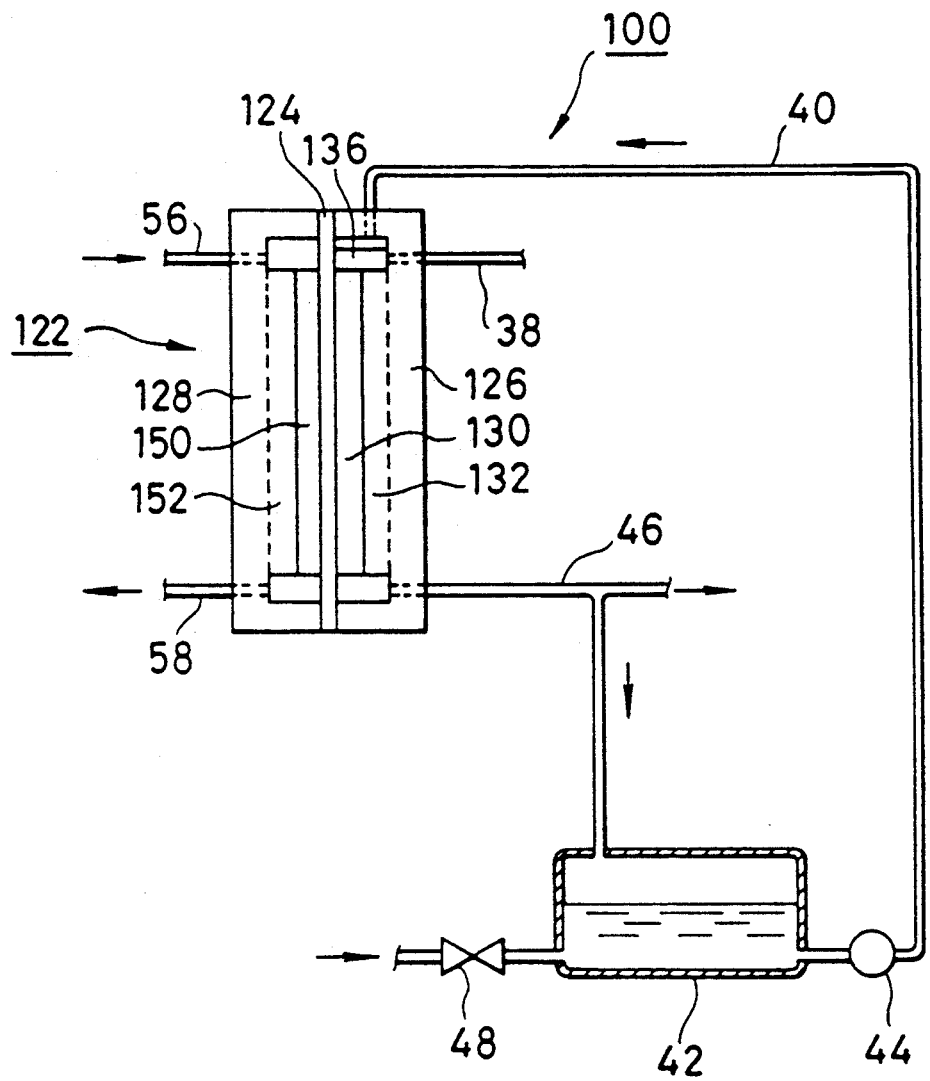
FIG. 7 is a partially cross sectioned schematic view showing a solid polymer electrolyte fuel cell system according to Embodiment 5 of the present invention.
Figure 8:
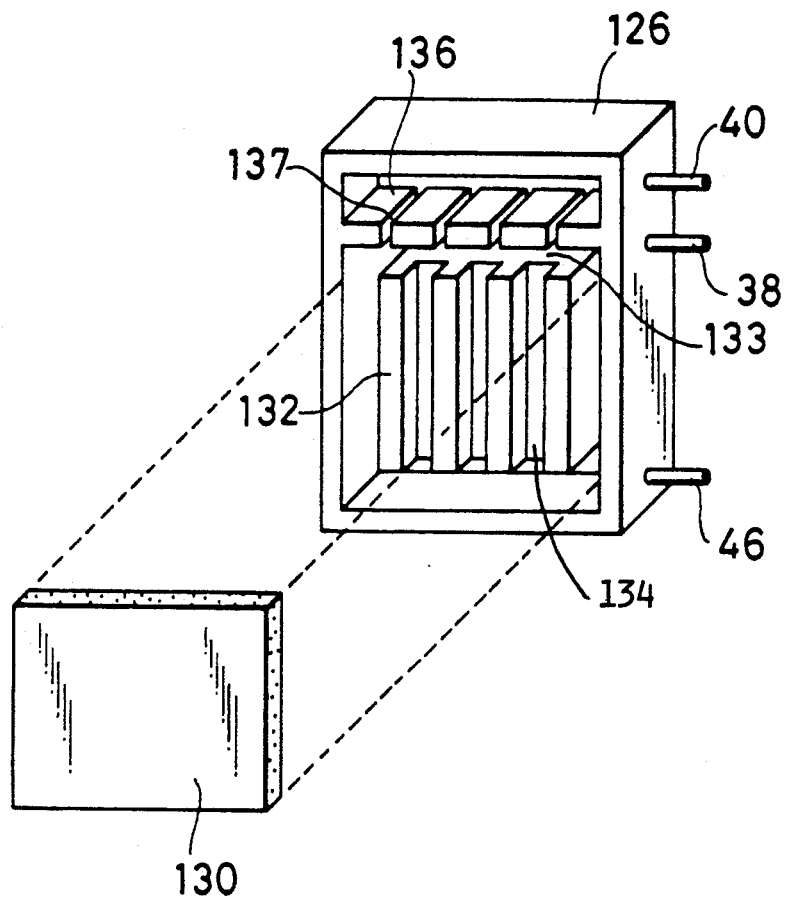
FIG. 8 is an exploded perspective view showing the interior of a ribbed anode chamber in the solid polymer electrolyte fuel cell system shown in FIG. 7.
Figure 8A:
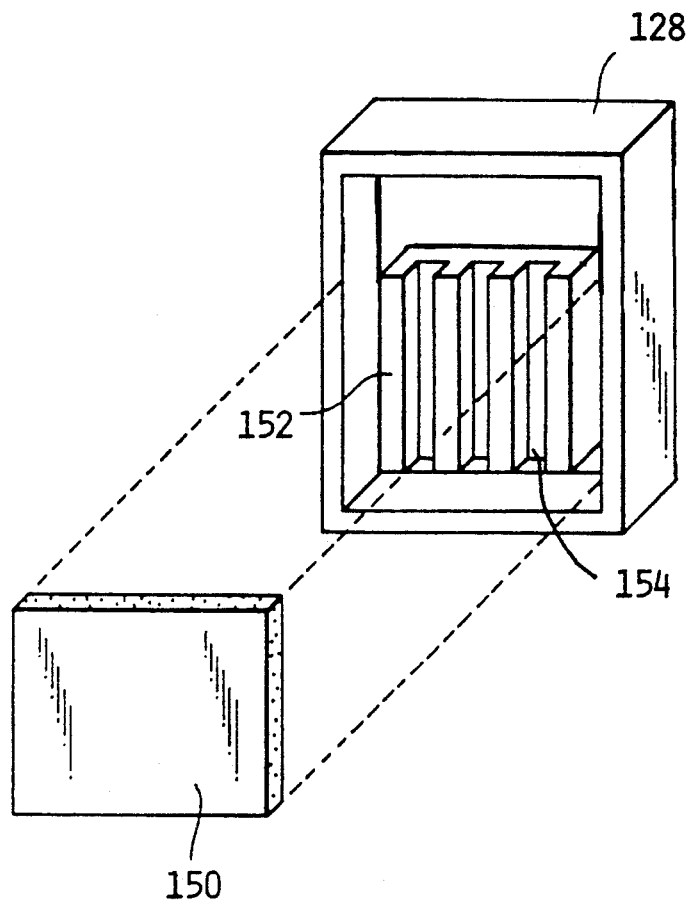
FIG. 8A is an exploded perspective view partially showing the interior of a ribbed cathode chamber in the solid polymer electrolyte fuel cell system of FIG. 7.

FIG. 7 is a partially cross sectioned schematic view showing a solid polymer electrolyte fuel cell system according to Embodiment 5. FIG. 8 is an exploded perspective view showing the interior of a ribbed anode chamber in the solid polymer electrolyte fuel cell system shown in FIG. 7. FIG. 8A is an exploded perspective view showing the interior of a ribbed cathode chamber in the solid polymer electrolyte fuel cell system shown in FIG. 7, with a feed pipe and a second discharge pipe being omitted. As shown in FIG. 7, an SPE fuel cell system 100 comprises a fuel cell 122 which includes an SPE membrane 124, a ribbed anode chamber 126 and a ribbed cathode chamber 128, the ribbed anode chamber 126 and the ribbed cathode chamber 128 sandwiching therebetween the SPE membrane 124. The ribbed anode chamber 126 and the ribbed cathode chamber 128 contain an anode 130 and a cathode 150, respectively. The anode and cathode are made of a porous carbon plate and coated with a platinum catalyst (not shown), and are pressed against the SPE membrane 124.

The ribbed anode chamber 126 has a plurality of ribs 132. The ribs 132 are parallel to each other and vertical, and define grooves 134 between any adjacent two of them. The ribs 132 are integral to a rib substrate 133 connected or integral to an inner side surface of the ribbed anode chamber opposing the SPE membrane 124. The ribbed cathode chamber 128 has a plurality of ribs 152 which may be of the same structure as the ribs 132 of the ribbed anode chamber 126, defining grooves 154 between any adjacent two thereof. Reaction gases (a fuel gas and an oxidizer gas) fed through gas feed pipes 38 and 56, respectively, flow through the vertical grooves 134 and 154, respectively, defined by the ribs 132 and 152 of the ribbed anode chamber 126 and the ribbed cathode chamber 128, respectively, together with the inner side surfaces of the anode and cathode chambers 126 and 128, respectively. Water in a liquid state is fed through a water feed pipe 40, separately of the fuel gas feed pipe 38, from a water reservoir 42 by a pump 44 and introduced into the anode chamber 126, and separated into a discharge water and a discharge fuel gas (unused). The separated water is fed back to the water reservoir 42, and recycled.

The water which flows into the anode chamber 126 from the water feed pipe 40 passes through slits 137 of a horizontal beam 136. The construction of the horizontal beam 136 having slits 137 is substantially the same as the horizontal beam 36 with slits 37 shown in FIG. 2. Since the amount of the water which flows through the slits 137 is small or restricted, the water flows down along the side surfaces of the groove defined by the ribs 132 and the anode but does not fill or close the grooves (or ducts when taken together with the inner side surface of the anode chamber), with the result that the flow of the fuel gas is not prevented. The water which is flowing down is partly absorbed by the ribs 132 of the ribbed anode 126 and migrates into the anode and then to the SPE membrane 124. The portion of the water which has not been absorbed reaches the bottom of the ribbed anode chamber and is combined there, and then discharged through the first discharge pipe 46. An oxidizer gas is fed to the ribbed cathode chamber 128 through an oxidizer gas feed pipe 56 and passes through the ribs 152 of the ribbed cathode chamber 128. The oxidizer gas is used in the electrode reaction which takes place in a three phase zone formed between the cathode and the SPE membrane to produce water. Unused portion of the oxidizer gas together with water produced (including water derived from hydration water in hydrated protons) is discharged through a second discharge pipe 58. A platinum catalyst layer (not shown) is provided between the ribbed cathode 150 and the SPE membrane 124. The structure of the ribbed cathode chamber 128 containing the ribs 152 may be substantially the same as the ribbed anode chamber 126 containing ribs 132 with the exception that in the cathode chamber no horizontal beam is provided.

Embodiment 6

Figure 9:
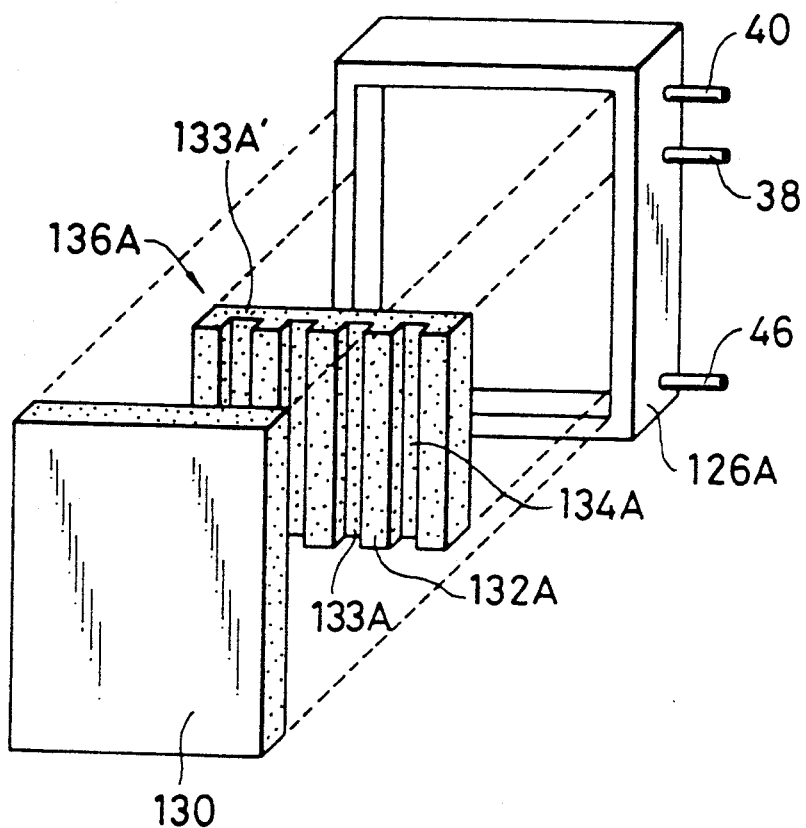
FIG. 9 is an exploded perspective view showing the interior of a ribbed anode chamber in a solid polymer electrolyte fuel cell system according to Embodiment 6 of the present invention.

FIG. 9 is an exploded perspective view showing the interior of a ribbed anode chamber in a solid polymer electrolyte fuel cell system according to Embodiment 7. A ribbed anode chamber 126A has as a water distribution means an electroconductive porous body 136A having a substrate 133A made of an electroconductive porous material provided with ribs 132A formed integral to the substrate 133A and defining grooves 134A between any adjacent two thereof. The ribs 133A arranged parallel to each other and vertical are in contact with the anode, and the substrate 133A is pressed or fixed to an inner side surface of the ribbed anode chamber 126A opposing the anode 130. Water is fed to an upper end 133A' of the porous body 136A and spreads through the entire body 136A. A portion of the water supplied migrates from the porous body 136A to the anode 130, and then is absorbed by the SPE membrane 124. Excessive water transudes from a lower end of the porous body 136A, and is discharged through a first discharge pipe 46 together with unused fuel gas. The electro-conductive porous body is made preferably of a metal. Also, carbon paper having high absorbing properties may be used.

Embodiment 7

Figure 10:
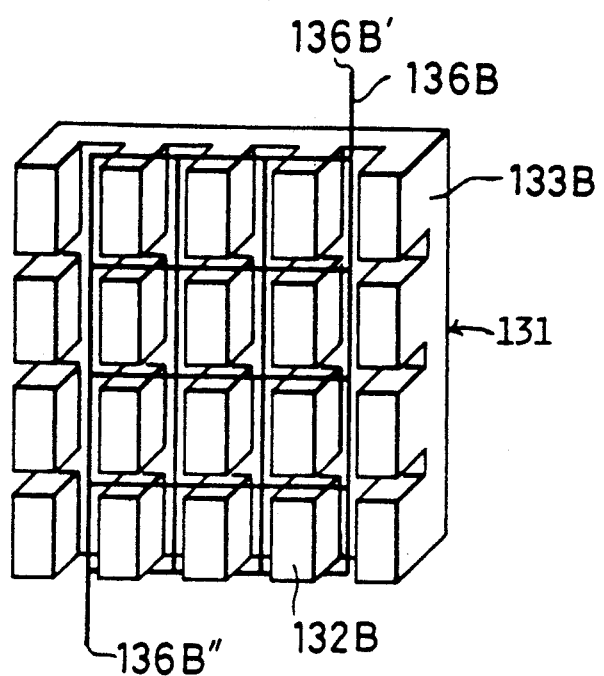
FIG. 10 is a perspective view showing a combination of ribs of a ribbed anode chamber and a network composed of a wick in a solid polymer electrolyte fuel cell system according to Embodiment 7 of the present invention.

FIG. 10 is a perspective view showing ribs of a ribbed anode and a wick in a solid polymer electrolyte fuel cell system according to Embodiment 7. A ribbed anode chamber 126 (FIG. 7) has a ribbed plate 131 having a substrate 133B provided with horizontal grooves and vertical grooves to form many island-like isolated protrusions or ribs 132B. The substrate is fixed to an inner side surface of the ribbed anode chamber opposing the anode. A wick 136B is provided around the respective ribs 132B to form a network. An upper end 136B' of the wick is arranged in the vicinity of an opening of a water feed pipe 40 (FIG. 7) in the anode chamber 126 (FIG. 7). Water supplied through the water feed pipe 40 (FIG. 7) to the upper end of the wick 136B' penetrates or passes through the wick 136B and migrates to the anode 130 through the ribs 132B of the ribbed anode chamber, and is absorbed by the SPE membrane 124 (FIG. 7). Unabsorbed water or excessive water transudes from a lower end 136B" of the wick, and is discharged through the second discharge pipe 58 (FIG. 7) together with unreacted fuel gas. The wick 136B is made of fine threads of a fibrous material preferably selected from various natural fiber, synthetic fiber or metallic fiber, the fine threads being twisted together.

Embodiment 8

Figure 11:
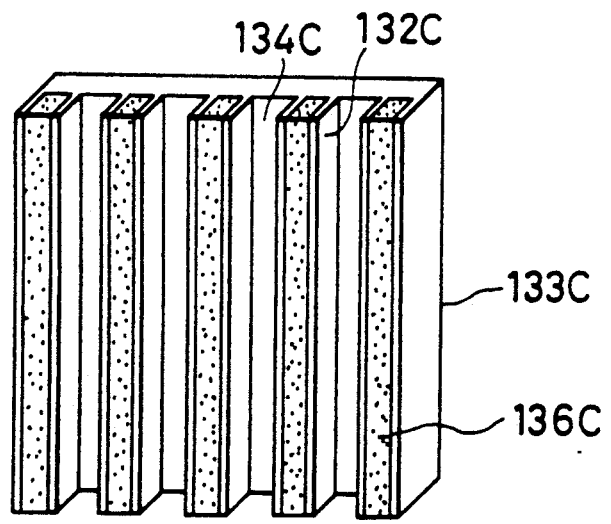
FIG. 11 is a perspective view showing a combination of ribs of a ribbed anode chamber and a hydrophilic band in a solid polymer electrolyte fuel cell system according to Embodiment 8 of the present invention.

FIG. 11 is a perspective view showing ribs of a ribbed anode chamber and a hydrophilic band in a solid polymer electrolyte fuel cell system according to Embodiment 8. A ribbed anode chamber 126 (FIG. 7) has therein a rib plate 133C having a plurality of integral ribs 132C vertically arranged and parallel to each other to define a groove 134C between any two adjacent ribs 132C. The substrate 133C is pressed against or fixed to an inner side surface of the ribbed anode chamber 126 opposing the anode 130 (FIG. 9). A hydrophilic band 136C is provided in every other groove 134C. Other particulars of the ribs and hydrophilic bands 136C are substantially the same as those of the ribs 32C and hydrophilic bands 36C in Embodiment 4 (FIG. 5). Water fed from the water feed pipe 40 (FIG. 9) flows down through a horizontal beam of the same structure as the horizontal beam 136 having slits 137 shown in FIG. 8 and is distributed to the plurality of hydrophilic bands 136C. A portion of the water supplied migrates from the hydrophilic bands 136C to the ribs 132C sandwiching the respective hydrophilic bands, and is absorbed by the SPE membrane 124 (FIG. 7). Excessive water transudes from respective lower ends of the hydrophilic bands 136C, and is discharged through the first discharge pipe 46 (FIG. 9). The hydrophilic band 136C may be a rod of a porous metal, a felt or a twisted yarn.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A solid polymer electrolyte fuel cell system comprising:
   a solid polymer electrolyte membrane;
   an anode chamber arranged in contact with said solid polymer electrolyte membrane;
   a cathode chamber arranged in contact with said solid polymer electrolyte membrane, said cathode chamber and said anode chamber sandwiching therebetween said solid polymer electrolyte membrane;
   a ribbed anode arranged in said anode chamber and having a first surface provided with a plurality of first ribs defining a plurality of first grooves and a second surface which is flat and in contact with said solid polymer electrolyte membrane;
   a ribbed cathode arranged in said cathode chamber and having a first surface provided with a plurality of second ribs defining a plurality of second grooves and a second surface which is flat and in contact with said solid polymer electrolyte membrane;
   a water feed pipe for feeding water connected to said anode chamber;
   a fuel gas feed pipe connected to said anode chamber and feeding a fuel gas;
   a water distribution means for distributing water fed from said water feed pipe to said plurality of first ribs, the water distribution means being arranged in said anode chamber;
   a first discharge pipe connected to said anode chamber and discharging an unused fuel gas and water;
   an oxidizer gas feed pipe connected to said cathode chamber and feeding an oxidizer gas; and
   a second discharge pipe connected to said cathode chamber and discharging an unused oxidizer gas and water;
   whereby said fuel gas passes in said first grooves and said oxidizer gas passes in said second grooves.

2. A solid polymer electrolyte fuel cell system as claimed in claim 1, wherein said water distribution means comprises a beam arranged above said ribbed anode and provided with a restricted passage through which said water from said water feed pipe flows down.

3. A solid polymer electrolyte fuel cell system as claimed in claim 1, wherein said water distribution means comprises an electroconductive porous body arranged in contact with said first surface of said ribbed anode.

4. A solid polymer electrolyte fuel cell system as claimed in claim 1, wherein said water distribution means comprises a network composed of a wick arranged along and between said first ribs of said ribbed anode.

5. A solid polymer electrolyte fuel cell system as claimed in claim 1, wherein said water distribution means comprises a beam arranged above said ribbed anode and provided with a restricted passage through which water flows down and a hydrophilic band arranged along and embedded in said first ribs of said ribbed anode.

6. A solid polymer electrolyte fuel cell system comprising:
   a solid polymer electrolyte membrane;
   a ribbed anode chamber arranged in contact with said solid polymer electrolyte membrane and having a first surface provided with a plurality of first ribs defining a plurality of first grooves;
   a cathode chamber arranged in contact with said solid polymer electrolyte membrane and having a first surface provided with a plurality of second ribs defining a plurality of second grooves, said cathode chamber and said anode chamber sandwiching therebetween said solid polymer electrolyte membrane;
   an anode arranged in said anode chamber having a first surface which is flat and in contact with said solid polymer electrolyte membrane, and a second surface which is flat and in contact with said first ribs of said ribbed anode chamber;
   a cathode arranged in said cathode chamber and having a first surface which is flat and in contact with said solid polymer electrolyte membrane and a second surface which is flat and in contact with said second ribs of said ribbed cathode chamber;
   a water feed pipe for feeding water connected to said ribbed anode chamber;
   a fuel gas feed pipe connected to said ribbed anode chamber and feeding a fuel gas;
   a water distribution means for distributing water fed from said water feed pipe to said plurality of first ribs of said ribbed anode chamber, the water distribution means being arranged in said ribbed anode chamber;
   a first discharge pipe connected to said ribbed anode chamber and discharging an unused fuel gas and water;
   an oxidizer gas feed pipe connected to said ribbed cathode chamber and feeding an oxidizer gas; and
   a second discharge pipe connected to said ribbed cathode chamber and discharging an unused oxidizer gas and water;
   whereby said fuel gas passes in said first grooves and said oxidizer gas passes in said second grooves.

7. A solid polymer electrolyte fuel cell system as claimed in claim 6, wherein said water distribution means comprises a beam arranged in an upper portion of said ribbed anode chamber and provided with a restricted passage through which said water from said water feed pipe flows down.

8. A solid polymer electrolyte fuel cell system as claimed in claim 6, wherein said water distribution means comprises an electroconductive porous body provided in said first ribs of said ribbed anode chamber.

9. A solid polymer electrolyte fuel cell system as claimed in claim 6, wherein said water distribution means comprises a network composed of a wick arranged along and between said first ribs of said ribbed anode chamber.

10. A solid polymer electrolyte fuel cell system as claimed in claim 6, wherein said water distribution means comprises a beam having a restricted passage for water and a hydrophilic band arranged along and embedded in said first ribs of said ribbed anode chamber.

* * * * *